United States Patent [19]
Przeworski et al.

[11] Patent Number: 5,091,239
[45] Date of Patent: Feb. 25, 1992

[54] METHODS AND ADHESIVES FOR BONDING POLYOLEFIN FILM

[75] Inventors: Richard A. Przeworski, Wayne, Pa.; Roy A. White, Somers, Conn.

[73] Assignee: CMS Gilbreth Packaging Systems, Inc., Trevose, Pa.

[21] Appl. No.: 490,825

[22] Filed: Mar. 7, 1990

[51] Int. Cl.$^5$ .............................................. B32B 9/00
[52] U.S. Cl. .................................... 428/195; 428/40; 428/42; 428/908; 156/86; 156/215; 156/218; 156/256; 283/81
[58] Field of Search ................... 428/195, 908, 40, 42; 283/81; 156/86, 215, 218, 256

[56] References Cited

U.S. PATENT DOCUMENTS

| | | | |
|---|---|---|---|
| 4,190,168 | 2/1980 | Jacques | 215/12 R |
| 4,240,861 | 12/1980 | Meckel et al. | 156/331 |
| 4,301,053 | 11/1981 | Wolfrey | 260/29.2 TN |
| 4,323,416 | 4/1982 | Malthouse et al. | 156/521 |
| 4,366,016 | 12/1982 | Golden, Jr. | 156/218 |
| 4,436,570 | 3/1984 | Neuhaus et al. | 156/273.3 |
| 4,544,431 | 10/1985 | King | 156/256 |
| 4,545,181 | 10/1985 | Frankefort | 53/459 |
| 4,562,684 | 1/1986 | Freher | 53/64 |
| 4,574,020 | 3/1986 | Fosnaught | 156/80 |
| 4,661,188 | 4/1987 | Fumei | 156/244.11 |
| 4,704,173 | 11/1987 | Hoffman | 156/86 |
| 4,714,512 | 12/1987 | House et al. | 156/306.6 |
| 4,735,668 | 4/1988 | Hoffmann et al. | 156/215 |
| 4,781,785 | 11/1988 | Szeremeta | 156/448 |
| 4,844,760 | 7/1989 | Dickey | 156/215 |

FOREIGN PATENT DOCUMENTS

1203515 4/1986 Canada .
1453540 10/1976 United Kingdom .

OTHER PUBLICATIONS

Technical Service report TSR 76-02 TF 116.
Estane Thermoplastic Polyurethane Polymer Price Schedule, dated Apr. 1, 1980.
Estane Product Data Sheet for Estane 5715.
Estane Product Data Sheet for Estane 5703.
UPACO Technical Data Sheet, dated 9/22/82.
UPACO Technical Data Sheet, dated 2/89.
KRATON FG 1901X Data Sheet, dated Jan. 1989.
*Handbook of Plastics and Elastomers*, Harper, ed., pp. 10-84 (1975).
Color brochure disclosing the Trine Model 5500G/S Contour Labeling Machine.

*Primary Examiner*—Patrick J. Ryan
*Assistant Examiner*—Elizabeth Evans
*Attorney, Agent, or Firm*—Morgan & Finnegan

[57] ABSTRACT

A method for wrapping a label about a container by employing a solvent activated adhesive composition. The method includes either a shrink wrap method, a mandrel wrapping method or a method employing a preformed roll of flat seamed tubular film. The roll of flat seamed tubular film is bonded at its seam by solvent activated adhesive. A roll for any of these methods with such adhesive, and a container covered by a film which includes strips of such adhesive is provided. A preferred adhesive comprises thermoplastic polyurethane with or without suitable additive.

60 Claims, 2 Drawing Sheets

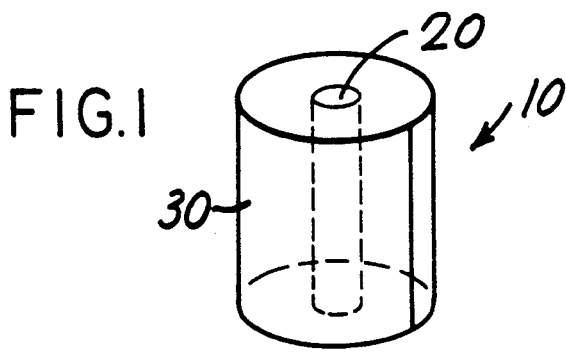
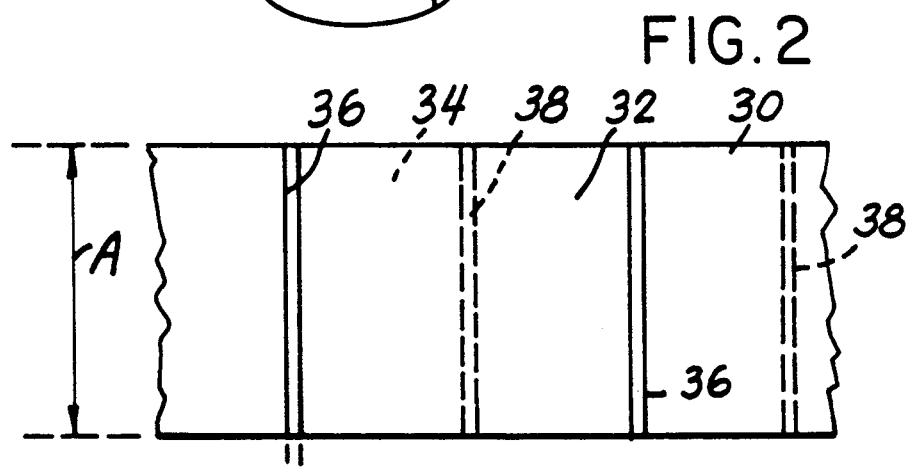
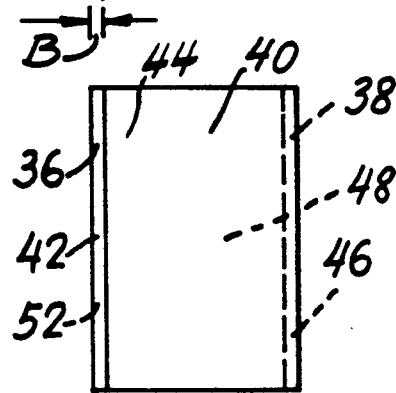
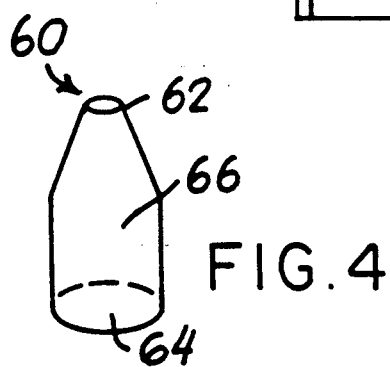
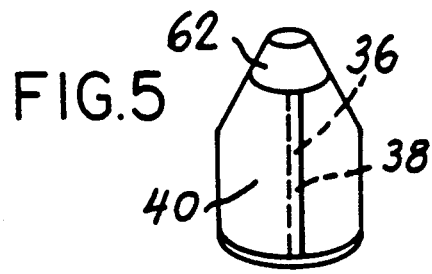

FIG. 7
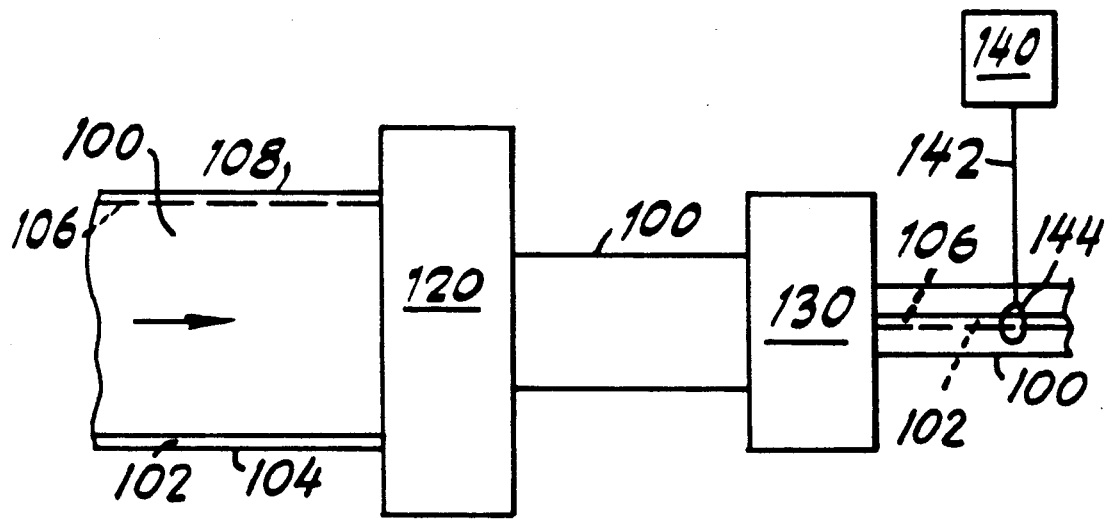
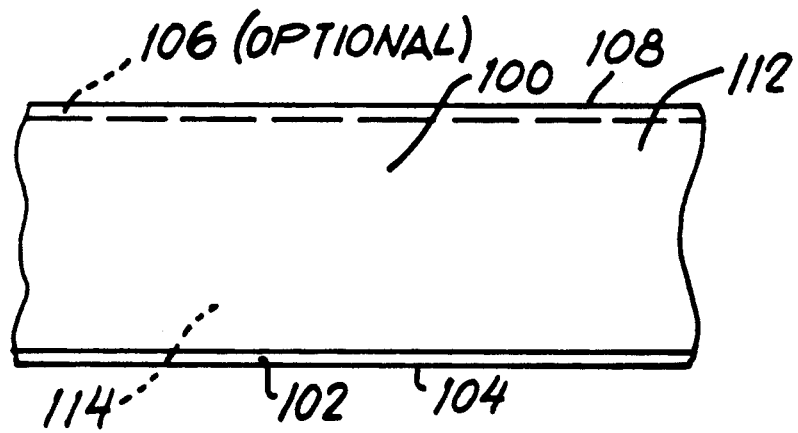
FIG. 6

METHODS AND ADHESIVES FOR BONDING POLYOLEFIN FILM

BACKGROUND OF THE INVENTION

I. Field of the Invention

The present invention pertains to adhesives for bonding polyolefin film, polyolefin film employing this adhesive and methods for applying the polyolefin film with adhesive to a container.

II. Discussion of Background References

Polyvinyl chloride is currently employed for shrink wrap films. However, use of polyvinyl chloride is diminishing due to actual or perceived environmental concerns. Thus, it would be desirable to find a substitute for polyvinyl chloride. Polyolefins such as polypropylene or polyethylene would be desirable alternatives but they are difficult to bond. Polypropylene is particularly difficult to bond because it has a low surface energy (i.e. 27 dynes/cm.). Tensile shear during heat shrinking of polypropylene causes overlapping film ends to separate from one another. This is particularly a problem in commercial use because ovens used to heat shrink the polypropylene film about a product typically have varying temperatures at different parts of the oven. Thus, the adhesive has to withstand local hot spots of typical 230°-250° F. In shrink wrap applications, where a label is attached to a container and then the container is spun such that the label wraps around the container, an adhesive needs to be able to stick on contact because typical commercial units wrap from 100 up to more than 1000 containers per minute.

There are basically three ways to apply a label to a container: wrap, mandrel and sleeve.

Wrap methods are disclosed by U.S. Pat. Nos. 4,844,760; 4,781,785; 4,694,633; 4,544,431; and 4,574,020 incorporated herein by reference. In the wrap method the label is attached to the container and then the container is spun to wrap the label about the container. The label is then heat shrunk if necessary.

Mandrel methods are disclosed by U.S. Pat. Nos. 4,496,409 and 4,366,016 incorporated herein by reference. In the mandrel method the label is wrapped about a mandrel and then drops off the mandrel to surround a container. The label is then heat shrunk to snuggly fit the container.

Sleeve methods are disclosed by U.S. Pat. Nos. 4,454,181; 4,562,684; and 4,806,187 incorporated herein by reference. By this method, a sleeve is cut from a pre-formed roll of flat tubular film. The sleeve is placed about the container and then heat shrunk to snuggly fit the container.

Elastomeric polyurethanes are known adhesives. U.S. Pat. Nos. 3,001,971 and 2,871,218 disclose some polyurethanes. Polyurethanes may include additives. U.S. Pat. No. 4,301,053 discloses an aqueous carboxyl functional urethane dispersion crosslinked with XAMA-7 (a trifunctional aziridine). Improved adhesion to plastic substrates was achieved by incorporating a small amount of n-methyl pyrrolidone into the formulation.

SUMMARY OF THE INVENTION

It is an object of the present invention to provide a method of attaching polyolefin labels, coated with a pattern of solvent activated adhesive, to containers at high speeds in wrap, mandrel or pre-formed sleeve applications.

It is another object of the present invention to provide a method of attaching oriented labels, coated with a pattern of solvent activated adhesive, to containers at high speeds and shrink wrapping these labels.

It is another object of the present invention to provide a polyolefin roll with dry adhesive applied thereto.

It is another object of the present invention to provide a roll of flat tube polyolefin film having a seam bonded by solvent activated dry adhesive.

It is another object of the present invention to provide an adhesive composition that is suitable for bonding polyolefin films and withstands heat shrinking of such films.

It is another object of the present invention to provide a container wrapped by a polyolefin film having a seam bonded by solvent activated adhesive.

The invention involves a method of applying labels to containers in wrap, mandrel or pre-formed sleeve procedures wherein a seam of the label is bonded by a solvent activated dry adhesive. Solvent activation means application of solvent or polymer thickened solvent to the dry adhesive to cause the adhesive to become temporarily tacky. Where the term "reactive" is employed in the present patent application, it refers to the physical effect of solvent on a material to soften and tackify the material. Thus, the terms reactive and solvent activatable are interchangable.

The solvent activated dry adhesive is preferably a thermoplastic, hard (Shore value greater than about 40 D) polyurethane with or without suitable additives. Most preferably the polyurethanes also have a Vicat Softening Point of at least about 250° F.

The adhesive is activated just prior to label application with a solvent which is not reactive with the label substrate material. The wrap method also involves rapidly attaching the leading edge of the label to a container, quickly wrapping the remainder of the label around the container by rotating the container, and then attaching the label trailing edge to the label leading edge. The films are preferably flame treated or corona treated prior to initially applying adhesive to form the patterns.

BRIEF DESCRIPTION OF THE DRAWINGS

FIG. 1 is a roll of polymer film with adhesive applied thereto;

FIG. 2 is a portion of the film of FIG. 1;

FIG. 3 is a single cut portion of the film of FIG. 1;

FIG. 4 is a container;

FIG. 5 is a container to which the portion of film of FIG. 3 has been applied;

FIG. 6 is a portion of film for a second embodiment of the present invention for producing a roll of flat tubular film; and FIG. 7 is a schematic top view of an apparatus for forming the film of FIG. 6 into a roll of flat tubular film.

DETAILED DESCRIPTION OF THE PREFERRED EMBODIMENTS

FIG. 1 shows a roll 10 of thermoplastic polyolefin film 30. The roll 10 has a hollow core 20. Preferably, film 30 is polyethylene or polypropylene. Most preferably, film 30 is polypropylene. Film 30 may be oriented or non-oriented and typically is about 1 to about 2 mils thick (1 mil=1 thousandth of an inch). Orientation, if any, may be in the machine direction or the transverse direction.

FIG. 2 shows a portion of film 30 and shows that film 30 has a first side 32 and a second side 34. A first set of dry adhesive patterns 36 are applied to the film first side 32 and a second set of dry adhesive patterns 38 are applied to the film second side 34.

The dry adhesive of the patterns 36, 38 is made of a thermoplastic polyurethane which is solvent activatable. Preferably the polyurethane has a Shore hardness of at least about 40 D and most preferably having a Shore hardness of at least about 50 D. Shore hardness is a standardized test and can be measured by ASTM D 2240. Preferably the polyurethanes for the present invention withstand having a 250° F. temperature for 2–3 seconds. Preferably they have a Vicat Softening temperature above about 200° F., most preferably above about 250° F., as measured by ASTM D 1525. Also, the polyurethanes are preferably insufficiently tacky when dry (prior to solvent activation) such that patterns 36, 38 would not stick to each other upon contact. This is desirable, in embodiments having adhesive on both sides of its film so the roll 10 may easily unwind upon use. Preferably adhesive on rolls for use in wrap or mandrel methods would not overcure. Thus they remain solvent activatable even after one or two months or more of storage.

The dry adhesive may comprise a single polyurethane or a mixture of one or more polyurethanes and an additive such as isocyanate. An example of effective polyurethane is Estane 5715. Estane 5715 is an adhesive made by The B.F. Goodrich Company, 6100 Oak Tree Blvd., Cleveland, Ohio 44131. The polyurethane/isocyante mixture may also contain a catalyst such as a tertiary amine or a metal. Suitable metals include tin, iron, titanium, lead or mercury. The catalysts result catalyst in faster cure but may reduce peel strength. One example of a metal catalyst in dibutyltin dilaurate.

An example of an effective combination of polyurethane with an additive is Estane 5715 with a remainder of up to about 20 weight percent (solids basis) Upaco 2660. Upaco 2660 is an isocyanate-containing prepolymer solution, 75% solids, which, if employed alone, converts to a thermoset urethane. It is manufactured by Worthen Industries Inc., Upaco Adhesives Division, 3 East Spit Brook Road, Nashua, NH 03060. The present invention also encompasses a dry adhesive composition for bonding polyolefin film comprising Estane 5715 and 2 to about 20% by weight UPACO 2660.

Other potential additives to the polyurethane adhesive include an aziridine, or a pre-polymer made from di- or tri-functional diols mixed with isocyanate. The isocyanate is preferably 2.2–3 functional isocyanate and employed in a polyurethane:isocyanate solids to solids (solvent free) weigth ratio of at least about 75:1. Preferably a ratio of about 75:1 to about 200:1.

Preferably, the aziridine is a polyfunctional aziridine and employed in a polyurethane:aziridine weight ratio (on a solvent free basis) from about 35:1 to about 140:1. Particularly preferred polyfunctional aziridines include Trimethylol propane-tris-(B-(N-Aziridinyl) propionate) (known as XAMA-2) and Pentaerythritol-tris-(B-(Aziridinyl) propionate) (known as XAMA-7). These particlar polyfunctional aziridines are available from Hoechst Celanese, Virginia Chemicals Co., 801 Water Street, Portsmouth, VA 23704.

Another adhesive, although not as preferred as polyurethanes, comprises a styrene-butadiene block polymer, or a styrene-ethylene butylene block polymer having a softening point of at least about 230° F. One example of a styrene ethylene butylene block polymer is Kraton G1901X manufactured by Shell Chemical Co., 1415 West 22nd Street, Oak Brook, Ill. 60522-9008. High melting tackifiers such as alpha methyl styrene, Cumar LX-509 (Cumarone INDENE, melting point 155° C.), or Neville Chem. LX-1035 may be combined with these block polymer adhesives in a weight ratio of e.g. 1.3 Kraton/1 tackifier.

Typical solvents for solvent activation include toluene, methyl ethyl ketone, ethyl acetate, methylene chloride, acetone or tetra hydro furan for urethane, and hexane, cyclohexane, pentane, isopentane for Kraton.

The roll 10 of film 30 having the adhesive pattern 36, 38 is made as follows.

The film 30 is preferably treated by corona treatment, flame treatment or other suitable surface treatment prior to affixing the dry adhesive patterns 36,38 to the film 30. This enhances the ability of the adhesive to stick to the polyolefin film 30. The adhesive, in solution form, is preferably applied to the film 30 by an apparatus such as a gravure press within one or two days of corona treatment. The adhesive is allowed to dry and the film 30 is wound into the roll 10. The film 30 is preferably corona treated to have a wetting energy of at least about 45 dynes/centimeter. Thus the film is typically used within one or two days of corona treatment. However, corona treated film, stored to prevent substantial contact with oil laden air, can retain its effectiveness for about a month or more.

A solution containing the adhesive is applied to a film, the adhesive is dried, and the roll is shipped. A typical film has a gauge between about 1 and about 2 mils, i.e., about 1.5 mils. Typically each pattern 36, 38 is long enough to run the width "A" of the film 30 and is about 4 to about 12 millimeters wide as represented by dimension "B". Each pattern 36, 38 is preferably about 0.1–about 0.5 mils thick (when dry) where these patterns will overlap and contact one another to form a joint seam. When time comes to use the film to which the adhesive has been applied, the adhesive is typically solvent-activated in about 0.05 seconds. Preferably when the adhesive laden film is applied to the product, or another pattern of adhesive, the adhesive sticks on contact. The adhesive may be applied as patterns 36, 38 to both sides of the film 30 as shown in FIG. 2 on the roll 10 such that, when the roll is cut into sheets for wrapping around an item, a two-way seal may be accomplished. In another embodiment, not shown, and adhesive pattern is only applied to one side of a roll.

Typically, the adhesive is applied to a roll of polyolefin, i.e., polypropylene film. One pattern 36 of adhesive on the first side 32 of the film and the next pattern 38 of the film and the next pattern 38 of adhesive on the second side 34 of the film. The roll with adhesive is then sold to a customer. The customer cuts labels from the roll, solvent activates the adhesive, and applies the film to a container or other item. The customer then shrink-wraps the film onto the container.

If desired, the styrene-rubber block polymer can be used to prime the surface of the film 30 to better accept the adhesive pattern 36, 38 comprising a thermoplastic polyurethane.

If desired, one may add an anti-blocking agent (drying filler) such as fumed silica to reduce the tack of the adhesive on the roll. A typical amount of this agent is about 1% of the adhesive. An example of this agent is Syloid 244 from W. R. Grace & Co., Davison Chemicals Division, 10 E. Baltimore Street, Baltimore, MD 21203.

A. WRAP METHOD

In the wrap method of the present invention, a label preform 40 shown in FIG. 3 is cut from the roll 10 of polyolefin film 30. The label preform 40 is cut such that the dry adhesive pattern 36 defines a leading end 42 of a first side 44 of the label preform 40. The label preform 40 is also cut such that the dry adhesive pattern 38 defines a trailing end 46 of a second side 48 of the label preform 40.

A suitable solvent is applied to the pattern 36 or pattern 38 or both patterns 36, 38 to activate the respective patterns. A leading end 52 of the second side 48 of the label preform 40 is then adherently contacted to contoured side walls 66 of a container 60 shown on FIG. 4. Container 60 also has a top wall 62 and bottom wall 64. Either adhesive, i.e., hot melt adhesive (also referred to in the art as glue), is applied to the leading end 52 of the label second side, or dry adhesive located on the leading end 52 is solvent activated, to promote adhesion of the leading end 52 to the container sidewalls 66. If dry adhesive is employed on the leading end, then it would have been affixed to the film 30 along with the patterns 36, 38.

The container 60 is then rotated such that the label preform 40 wraps around the container sidewalls 66. The trailing end 46 of the label preform overlaps the leading end 42 and the pattern 38 contacts and bonds to the pattern 36. If only one of patterns 36, 38 had been solvent activated prior to such contact, then, the solvent on the activated pattern will activate the remaining pattern upon contact. The label preform 40 is then heat shrunk by conventional techniques to snuggly fit the container 60 as shown in FIG. 5.

For wrap methods, the bond is established and holds in less than 0.1 seconds after overlap contact. For shrink wrap applications, the adhesive is strong enough to hold without coming apart at 200° F., preferably 250° F. for 2-3 seconds. If a cure is required, it is effective within several seconds at about 140° F. in a preheat line before a shrinking line.

The adhesive has another advantage in that it is not stiff or heavily applied such that it would alter the heat shrink properties in the seam area. The adhesive withstands outdoor storage. Furthermore, the adhesive holds the film despite rough handling, 140°-160° F. warehousing and shipping, moisture exposure, and exposure to miscellaneous solvents such as alcohol or paint solvents.

B. MANDREL METHOD

The roll 10 of the film 30 having adhesive patterns 36, 38 affixed to it may also be employed in wrapping methods accomplished with a mandrel (not shown, but mandrels are known in the art).

In such a method the label preform 40 is cut from the film 30 and the pattern 36 or pattern 38 or both patterns 36, 38 are solvent activated by being wiped with solvent. Then the label preform 40 is wrapped about the mandrel such that pattern 38 overlaps, contacts and bonds with pattern 36. This forms a tube of film with a seam bonded by the solvent activated adhesive. Then this tube is dropped over a container 60 and heat shrunk to snuggly fit container 60 as shown in FIG. 5.

C. METHOD FOR MAKING ROLLS OF FLATTENED SEAMED FILM TUBING

Another embodiment of the present invention is employed to make rolls of flattened seamed film tubing that can be sold to a customer who cuts individual tubes from these rolls and shrink wraps these individual tubes about individual containers.

FIG. 6 shows a portion of a roll of oriented polyolefin (preferably polyethylene or polypropylene) film 100 that is suitable to form a roll of flattened seaming tubing. A first pattern 102 of dry adhesive is affixed to a first longitudinal edge 104 of a first side 112 of the film 100. A second pattern 106 of dry adhesive is optionally affixed to a second longitudinal edge 108 of a second side 114 of the film 100. The patterns 102, 106 were preferably affixed to the film 100 after surface activation of the film 100 by corona, flame or other suitable treatment. The adhesive, in liquid form, is typically applied to the film 100 within one or two days of corona treatment and allowed to dry. The film 100 having patterns 102, 106 of dry adhesive is then formed into a roll suitable as feed to a tubing machine.

FIG. 7 schematically shows a top view of a tubing machine to accomplish a method of the present invention. The film 100 having patterns 102, 106 of dry adhesive passes in the direction shown through a means 120 for upwardly folding the longitudinal edges 104, 108. The partly folded film 100 then passes through a means 130 for folding over and overlapping the longitudinal edges 104, 108. Solvent from a solvent source 140 then passes through a solvent conduit 142 to a solvent applicator 144 located between the overlapped longitudinal edges 104, 108. Applicator 144 applies solvent to either or both patterns 102, 106. Then the patterns 102, 106 on edges 104, 108, respectively, contact and bond to form a tube. The tube is then rolled to form the roll of flattened seamed tubing.

Although the above shown embodiment employs two patterns 102, 106, only a single pattern (either pattern 102 or pattern 106) need be employed. Preferably the film side without adhesive has a wetting energy of at least 45 dynes per centimeter when only one pattern is employed.

Adhesives, solvents, and films suitable for shrink wrap and mandrel methods are also employed for preforming flattened seamed film tubing. However, flattened seamed film tubing allows more time for the bonded adhesive seam to cure than do shrink wrap and mandrel methods. Thus, preferable polyurethanes have a Shore hardness value as low as 70 A and more preferably at least 80 A. The A scale for Shore hardness measures to lower values than does the aforementioned D scale. The A scale is measured by ASTM D 2240. A typical overlap of the A and D scales has about 95 A equal to about 50 D.

The present invention is further described by the following non-limiting examples. These examples are all for shrink wrap applications. The laboratory shrink wrapping occurred with hot spots as high as about 250° F. by passing the films attached to containers through a tunnel oven for about 8 seconds. The tunnel oven blows air, heated to about 350° F., over the containers. The films are initially attached to the containers by capillary action when the film contacts liquid. In particular, the liquid is solvent of the type applied to the adhesive strip.

TABLE 1

| Ex. No. | Adhesive Trade Name (Nature) | Use | Dry Adhesive Sticks to: Itself | Dry Adhesive Sticks to: PP Roll | Activation Solvent | Test Protocol | Comments After Heat Exposure |
|---|---|---|---|---|---|---|---|
| 1 | Upaco HT2660 thermoset (polyurethane) | Diluted in Ethyl Acetate | Yes | A, b | Ethyl Acetate | 1 | D, E |
| 2 | Estane 5715 (polyurethane) | Dissolved in MEK | No | No, c | Toluene | 1, 4 | B, F |
| 3 | Kraton G1901X (styrene rubber block polymer) | Dissolved in Toluene | A | No, c | Toluene | 1, 4 | B, G |
| 4 | Estane 5715 (polyurethane) | Dissolved in MEK | No | No, c | Toluene | 1, 5 | B, F |
| 5 | Estane 5715 (polyurethane) | Dissolved in MEK | No | No, c | Toluene | 2, 3, 5 | B, F |
| 6 | Estane 5703P (polyurethane) | Dissolved in MEK | Yes | A, c | MEK | 2, 4 | C, F |
| 7 | Kraton G1901X (styrene rubber block polymer) | Dissolved in Toluene | A | No, b | Pentane | 2, 5 | B |

Key to notes: see Table 2

Table 2 shows the results from using formulations of Estane 5715 (hereinafter Estane) blended with Upaco 2660 (an isocyanate prepolymer, hereinafter Upaco), trimethylolpropane-tris-(B-(N-Aziridinyl) Propionate) (XAMA-2), pentaerythritol-tris-(B-(Aziridinyl) propionate) (XAMA-7), or PAPI-20 (a polymethylene polyphenyl isocyanate manufactured by Upjohn Polymer Chemicals, Box 685 LaPorte, TX 77571), in the method described for Examples 1–7. Unless otherwise indicated, up to 1 part dibutyltin dilaurate catalyst was added to 125 parts by weight of adhesive. Typically the formulations are initially applied to film as 15% Estane in solution with additive.

TABLE 2

| Ex. No. | Formulation | Solid Weight Ratio | Dry Adhesive Sticks to: Itself | Dry Adhesive Sticks to: PP Roll | Activation Solvent | Test Protocol | Comments After Heat Exposure |
|---|---|---|---|---|---|---|---|
| 8 | Estane/Upaco | 8:1 | No | No, b | Toluene | 5 | B |
| 9 | Estane/Upaco* | 8:1 | No | No, b | Toluene | 5 | B |
| 10 | Estane/Upaco* | 4:1 | No | No, b | Toluene | 5, 7 | B |
| 11 | Estane/XAMA-2 | 140:1 | No | No, c | Toluene | 5, 7 | B, G |
| 12 | Estane/XAMA-2 | 140:1 | No | No, b | Toluene | 5 | B |
| 13 | Estane/XAMA-7 | 35:1 | No | No, b | Toluene | 5, 7 | B |
| 14 | Estane/PAPI-20 | 75:1 | No | No, b | Toluene | 5 | B |
| 15 | Estane/PAPI-20 | 37.5:1 | No | No, b | Toluene | 5, 7 | B, D, E |

Key to Tables 1 and 2
*No dibutyltin dilaurate (only applies to Table 2)
1 - Adhesive applied to film at 3.0 mils thick wet (typically 15% adhesive in solution).
2 - Adhesive applied to film at 1.5 mils thick wet (typically 15% adhesive in solution).
b - Corona treated on both sides of film to more than 45 dynes/cm wetting strength.
c - Corona treated on both sides of film: one side <45 dynes/cm, one side >45 dynes/cm wetting strength.
3 - Adhesive layer is on one side of film only.
4 - Apply solvent with swab, overlap, wait four hours before oven testing.
5 - Apply solvent with swab, overlap, run through immediately.
6 - No test preformed.
7 - Adhesive aged/cured one week.
A - Slightly sticky, but does not damage adhesive layer when pulled out.
B - No failure.
C - Opened slightly, some legging
D - Did not activate with solvent.
E - Adhesive overcured.
F - Peel strength is inadequate at room temperature, after oven shrink.
G - Peel strength is marginal, poor on side having less than 45 dynes/centimeter wetting strength.
PP - Polypropylene.

Inadequate peel strength means less than 200 grams per inch of seam width. Although inadequate for some uses, it is suitable for other uses such as those with low potential for vandalism or rough handling.

Example 1 with only Upaco 2660 is a comparative example. Its adhesive overcured so it could not be tested. Such non-solvent activatable adhesives are not within the scope of the present invention. Upaco 2660 is an isocyanate prepolymer which becomes a thermoset polyurethane upon sufficient contact with moisture in air. Thus, by itself it is not a thermoplastic polyurethane.

EXAMPLE 16

The following is an example of how to prepare a hard urethane. The following polyols are weighed together and deaerated/desiccated by heating at 120° C. under vacuum for 15 minutes: 100.0 grams polybutanediol adipate (Ruco S-102-120, hydroxyl number: 120) and 33.5 grams hydroxyethyl resorcinol.

The molten polyol mix is placed in 85° C. bath for 2 minutes and 68.4 grams solid MDI, 1,4 diphenylmethane diisocyanate, is added and mixed in for two minutes under vacuum. The MDI melts and the mixture turns clear, then cloudy. The mixture is then transferred to a fluorocarbon-lined container, purged with nitrogen, sealed, and cooled to room temperature. The container is stored for one hour at room temperature, then is reheated in a glycerine bath set at 120° C. for 30 minutes. The container is then transferred to a 140° C. oven and left to polymerize for 3.5 hours.

Following this procedure, a thermoplastic urethane with a Shore D hardness value of 58 was obtained. By contrast, Estane 5715 (B.F. Goodrich) Shore D hardness value is 57-58 by our testing.

While specific embodiments of the composition, method and product aspects of the present invention have been shown and described, it should be apparent that many modifications can be made thereto without departing from the spirit and scope of the invention. Accordingly, the invention is not limited by the foregoing description, but is only limited by the scope of the claims appended hereto.

We claim:

1. A method for high speed application of labels, having thermoplastic polyolefin film, to container walls, said labels each having a first side leading end and a second side trailing end comprising the steps of:
  a) activating at least one member of the group of a pattern of dry adhesive affixed to and defining said leading end of said first side of said film and a pattern of dry adhesive affixed to and defining said trailing end of said second side of said film, by applying a solvent thereto, said solvent being reactive with said dry adhesive but not being reactive with said film;
  b) overlapping, contacting and bonding said first side leading end with said second side trailing end with said solvent activated dry adhesive therebetween; and
  c) applying said label to the walls of a container.

2. The method of claim 1, wherein said first side leading end and said second side trailing end each have one of said patterns affixed thereto and said solvent is applied to said pattern on either said first side leading end or said second side trailing end, and said solvent on the applied end contacts the pattern on the remaining end to activate said pattern on said remaining end.

3. The method of claim 1, wherein said first side leading end and said second side trailing end each have one of said patterns affixed thereto and said solvent is applied to both of said patterns prior to said overlapping step.

4. The method of claim 1, further comprising cutting said label from a roll of said thermoplastic polyolefin film having said patterns of said dry adhesive affixed to its first and second sides such that said dry adhesive defines said leading edge of said first side of said label and said trailing edge of said second side of said label.

5. The method of claim 1, said film comprising oriented polyolefin; said container having contoured sidewalls; further comprising heat shrinking said applied label to conform to said contoured sidewalls; and wherein said applying step comprises the sequential steps of adherently contacting a leading end of said second side of said label to said container, rotating said container and overlapping and bonding said label second side trailing edge pattern to said label first side leading edge pattern, and wherein said patterns each are about 4 to about 12 millimeters wide.

6. The method of claim 5, further comprising applying hot melt adhesive to said second side leading end such that said second side leading end adheres to said container.

7. The method of claim 5, wherein said second side leading end has a pattern of dry adhesive affixed thereto, further comprising solvent activating said pattern at said second side leading end such that said second side leading end adheres to said container.

8. The method of claim 1, further comprising wrapping said label about a mandrel after said activating step, wherein said overlapping occurs upon said mandrel, and wherein said applying steps comprises passing said label from said mandrel to encircle a perimeter about said container and shrink wrapping said label to said container, said patterns on said first and second ends each being about 4 to about 12 millimeters wide.

9. The method of claim 1, wherein said dry adhesive comprises a thermoplastic polyurethane having a Shore hardness of at least about 40 D.

10. The method of claim 9, wherein said patterns of dry adhesive, if contacted prior to solvent activation, would not stick to one another and said patterns have a Vicat softening point of at least about 250° F.

11. The method of claim 9, wherein said polyurethane has a Shore hardness of at least about 50 D and said film has a wetting energy of at least about 45 dynes/centimeter.

12. The method of claim 9, wherein said adhesive further comprises a member of the group of isocyanate, a pre-polymer made from di-functional diol mixed with isocyanate, and pre-polymer made from a tri-functional diol mixed with isocyanate.

13. The method of claim 12, wherein said isocyanate is a 2.2-3 functional isocyanate and is employed in a polyurethane: isocyanate weight ratio of about 75:1 to about 200:1 on a solids basis.

14. The method of claim 9, wherein said adhesive further comprises an aziridine.

15. The method of claim 14, wherein said aziridine is a polyfunctional aziridine and employed in a polyurethane: aziridine weight ratio from about 35:1 to about 140:1 on a solids basis.

16. The method of claim 1, wherein said adhesive comprises a styrene-butadiene block polymer or styrene-ethylene butylene block polymer, having a softening point of at least about 230° F.

17. The method of claim 16, wherein said adhesive further comprises alpha methyl styrene.

18. The method of claim 1, wherein said solvent is selected from the group of toluene, methyl ethyl ketone, ethyl acetate, methylene chloride, hexane, cyclohexane, pentane, isopentane, acetone and tetra hydro furan.

19. The method of claim 1, wherein said polyolefin is polypropylene.

20. The method of claim 1, wherein said polyolefin is polyethylene.

21. The method of claim 1, wherein at least 100 labels per minute are attached to respective containers.

22. The method of claim 21, wherein at least 1000 labels per minute are attached to respective containers.

23. The method of claim 21, wherein said dry adhesive comprises Estane 5715 and 0 to about 20% by weight UPACO 2660 on a solids basis.

24. A method for forming a roll of flattened seamed tubing comprising the steps of:
  a) unwinding a roll of oriented polyolefin film having a first pattern of dry adhesive affixed to a first longitudinal edge on a first side of said film, said first pattern being about 4 to about 12 millimeters wide;

b) activating said pattern of dry adhesive by applying a solvent thereto, said solvent being reactive with said dry adhesive but not being reactive with said film, said adhesive pattern defining said first longitudinal edge;

c) overlapping, contacting and bonding said first longitudinal edge on said first side of said film to a second longitudinal edge on the second side of said film; and d) rolling said film containing bonded edges to form said roll of flattened tubing.

25. The method of claim 24, wherein said second longitudinal edge of said second side of said film has a second pattern of said dry adhesive affixed thereto, and further comprising activating said second pattern by contacting with solvent.

26. The method of claim 24, wherein said dry adhesive comprises a thermoplastic polyurethane having a Shore hardness of at least about 80 A.

27. The method of claim 24, wherein said dry adhesive has a Shore hardness of at least about 50 D.

28. The method of claim 24, wherein said dry adhesive comprises a styrene-butadiene block polymer, or a styrene-ethylene butylene block polymer.

29. The method of claim 24, wherein said solvent is selected from toluene, methyl ethyl ketone, ethyl acetate, alcohol, methylene chloride, hexane, cyclohexane, pentane isopentane, acetone or tetra hydro furan.

30. The method of claim 24, wherein said polyolefin is oriented polypropylene.

31. The method of claim 24, wherein said polyolefin is oriented polyethylene.

32. The method of claim 31, wherein said polyolefin has a wetting strength of at least 45 dynes per centimeter.

33. A roll of oriented seamed polyolefin film comprising said film and a pattern of dried, solvent-activated adhesive longitudinally affixed at the seam of said film.

34. A roll of label preforms for application to respective containers and the like comprising,
a roll of hydrocarbon polymer film; said film having a repeating pattern of dry solvent-activatable adhesive applied to one side thereof to define a series of attached label preforms with leading and trailing ends defined by the presence of said dry adhesive.

35. The roll of label preforms of claim 34, wherein said film comprises polypropylene or polyethylene.

36. The roll of label preforms of claim 35, wherein said dry adhesive comprises thermoplastic polyurethane having a Shore hardness of at least about 40 D.

37. The roll of label preforms of claim 35, wherein said film has a wetting strength of at least about 45 dynes/centimeter.

38. The roll of label preforms of claim 36, wherein said polyurethane has a Shore hardness of at least about 50 D and a Vicat softening point of at least about 250° F.

39. The roll of label preforms of claim 36, wherein said adhesive further comprises an isocyanate or further comprises an isocyanate pre-polymer made from di- or trifunctional diols mixed with isocyanate.

40. The roll of label preforms of claim 39, wherein said isocyanate is a 2.2-3 functional isocyanate and is employed in a polyurethane:isocyanate weight ratio of about 75:1 to about 200:1 on a solids basis.

41. The roll of label preforms of claim 36, wherein said adhesive further comprises an aziridine.

42. The roll of label preforms of claim 41, wherein said aziridine is a polyfunctional aziridine and employed in a polyurethane: aziridine weight ratio of about 35:1 to about 140:1 on a solids basis.

43. The roll of label preforms of claim 34, wherein said adhesive comprises a styrene butadiene block polymer, or a styrene-ethylene butylene block polymer, having a melting point of at least about 230° F.

44. The roll of label preforms of claim 43, wherein said adhesive further comprises alpha methyl styrene.

45. The roll of label preforms of claim 36, wherein said adhesive comprises Estane 5715 and 0 to about 20% by weight UPACO 2660.

46. A container having sidewalls and a label, comprising film, affixed thereto made by:
a) activating a pattern of dry adhesive affixed to a leading edge of a first side of said film and a trailing end of a second side of said solvent thereto, said solvent being reactive with said dry adhesive but not being reactive with said film, said adhesive pattern defining said first side leading end and said second side trailing end;
c) applying said label to said container.

47. A container having sidewalls, wherein at least a portion of said sidewalls are contoured, and a heat shrink wrapped film label affixed thereto made by:
a) activating a pattern of dry adhesive affixed to a leading edge of a first side of said film and a trailing end of a second side of said solvent thereto, said solvent being reactive with said dry adhesive but not being reactive with said film, said adhesive pattern defining said first side leading end and said second side trailing end;
b) overlapping, contacting and bonding said first side leading end pattern with said second side trailing end pattern;
c) applying said label to said container; and
d) heat shrinking said label to conform to said contoured sidewalls.

48. A dry adhesive composition for bonding oriented polyolefin film comprising Estane 5715 and an additive selected from UPACO 2660, a polyfunctional aziridine or an isocyanate.

49. The adhesive composition of claim 48, wherein said additive is UPACO 2660 and said adhesive comprises 2-20 percent by weight on a solids basis of said UPACO 2660.

50. The method of claim 21, wherein said dry adhesive comprises a thermoplastic polyurethane having a Shore hardness of at least 50 D and 0 to about 20% by weight on a solids basis, of an isocyanate-containing pre-polymer solution.

51. The method of claim 50, wherein said polyurethane has a Shore hardness of 57-58 D.

52. The adhesive composition of claim 50, wherein said isocyanate-containing pre-polymer solution is such that it would become a thermoset polyurethane, upon sufficient contact with air, if not for the presence of said thermoplastic polyurethane.

53. The roll of label preforms of claim 36, wherein said adhesive comprises a thermoplastic polyurethane having a Shore hardness of at least 50 D and 0 to about 20% by weight, on a solids basis, of an isocyanate-containing pre-polymer solution.

54. The roll of label preforms of claim 53, wherein said polyurethane has a Shore hardness of 57-58 D.

55. The roll of label preforms of claim 53, wherein said isocyanate-containing prepolymer solution is such that it would become a thermoset polyurethane, upon sufficient contact with air, if not for the presence of said thermoplastic polyurethane.

56. A dry adhesive composition for bonding oriented polyolefin film comprising a thermoplastic polyurethane having a Shore hardness of at least 50 D and an additive selected from an isocyanate-containing pre-polymer solution, a polyfunctional aziridine or an isocyanate.

57. The adhesive composition of claim 56, wherein said thermoplastic polyurethane has a Shore hardness of 57-58 D.

58. The adhesive composition of claim 56, wherein said additive is said isocyanate-containing pre-polymer solution and said adhesive comprises 2-20 percent by weight on a solids basis of said additive.

59. The adhesive composition of claim 58, wherein said additive is such that it would become a thermoset polyurethane upon sufficient contact with air, if not for the presence of said polyurethane.

60. The adhesive composition of claim 59, wherein the solids weight ratio of said thermoplastic polyurethane to said isocyanate-containing prepolymer solution ranges from 4:1 to 8:1.

* * * * *